United States Patent [19]
Saito

[11] Patent Number: 5,581,609
[45] Date of Patent: Dec. 3, 1996

[54] ISDN TERMINAL

[75] Inventor: Toshiaki Saito, Tokyo, Japan

[73] Assignee: Canon Kabushiki Kaisha, Tokyo, Japan

[21] Appl. No.: 283,145

[22] Filed: Aug. 1, 1994

Related U.S. Application Data

[63] Continuation of Ser. No. 842,601, Feb. 27, 1992, abandoned.

[30] Foreign Application Priority Data

Mar. 15, 1991 [JP] Japan ................................. 3-075893

[51] Int. Cl.⁶ .................................................. H04M 11/00
[52] U.S. Cl. ............................................... 379/100; 379/94
[58] Field of Search .................................. 379/93, 94, 96, 379/97, 98, 100; 358/400, 434, 439, 442, 437, 468; 370/110.1, 94

[56] References Cited

U.S. PATENT DOCUMENTS

| | | | |
|---|---|---|---|
| 4,888,766 | 12/1989 | Ogasawara | 370/110.1 |
| 4,961,185 | 10/1990 | Sawada | 370/110.1 |
| 4,995,073 | 2/1991 | Okata et al. | 379/100 |
| 5,042,028 | 8/1991 | Ogawa | 379/94 |
| 5,050,005 | 3/1989 | Kagami | 358/434 |
| 5,081,539 | 1/1992 | Kaneko | 358/437 |
| 5,113,396 | 5/1992 | Kagami | 379/100 |
| 5,138,466 | 8/1992 | Saito | 358/435 |
| 5,142,568 | 8/1992 | Ogata et al. | 379/100 |
| 5,153,744 | 10/1992 | Nobuta | 358/400 |

*Primary Examiner*—Jason Chan
*Attorney, Agent, or Firm*—Fitzpatrick, Cella, Harper & Scinto

[57] ABSTRACT

A transferring method from an ISDN telephone to an ISDN data terminal comprises the steps of: transmitting a message to request a temporary interruption of a call to the ISDN from the call received ISDN telephone; transmitting a message to request a start of the interruption call to the ISDN from the ISDN data terminal connected to the same bus, as that of the ISDN telephone; and executing a data communication such as a G3 facsimile communication by the ISDN data terminal.

25 Claims, 9 Drawing Sheets

ISDN TERMINAL

This application is a continuation of application Ser. No. 07/842,601, filed Feb. 27, 1992, now abandoned.

BACKGROUND OF THE INVENTION

1. Field of the Invention

The invention relates to an ISDN terminal to communicate in accordance with a procedure of the ISDN.

2. Related Background Art

In the ISDN, terminals of telephones, facsimile apparatuses, and the like can be simultaneously connected to the same bus. Since signals can be transmitted and received between the ISDN and the PSTN, the ISDN terminals and the PSTN terminals can mutually communicate. Among the facsimile apparatuses as ISDN terminals, there is an apparatus having a function to execute the G3 protocol. Such an apparatus can mutually communicate with a G3 facsimile apparatus as a PSTN terminal.

However, when a call is received via the PSTN, the ISDN terminal cannot discriminate whether the call reception is call reception from a telephone or a G3 facsimile apparatus. Therefore, either one of the ISDN telephone connected to the same bus and the ISDN facsimile apparatus having the G3 function which has first responded is connected to the call generation side.

In the case of the call reception from the PSTN G3 facsimile apparatus at that time, so long as the operator has responded by using the ISDN telephone, he can judge that the terminal on the call generation side is a facsimile apparatus. However, the operator cannot perform the facsimile communication.

In the case of the call reception from the PSTN telephone at that time, so long as the ISDN facsimile apparatus having the G3 function has responded earlier than the ISDN telephones, the operator on the call generation side cannot perform speech communication.

SUMMARY OF THE INVENTION

It is an object of the invention to improve the ISDN terminals.

Another object of the invention is to enable a call received by an ISDN telephone to be temporarily interrupted and to enable such a call to be restarted by the ISDN data terminal.

Still another object of the invention is to improve the operation performance in the case of restarting the call which has been interrupted by the ISDN.

Further another object of the invention is to provide an ISDN terminal for temporarily interrupting a call by using services of the ISDN in the case where a communication partner is not a predetermined terminal and for requesting to restart the interrupted call by another terminal.

The above and other objects and features of the present invention will become apparent from the following detailed description and the appended claims with reference to the accompanying drawings.

2

DETAILED DESCRIPTION OF THE PREFERRED EMBODIMENTS

An embodiment of the invention will be described hereinbelow with reference to the drawings.

Figure 1:
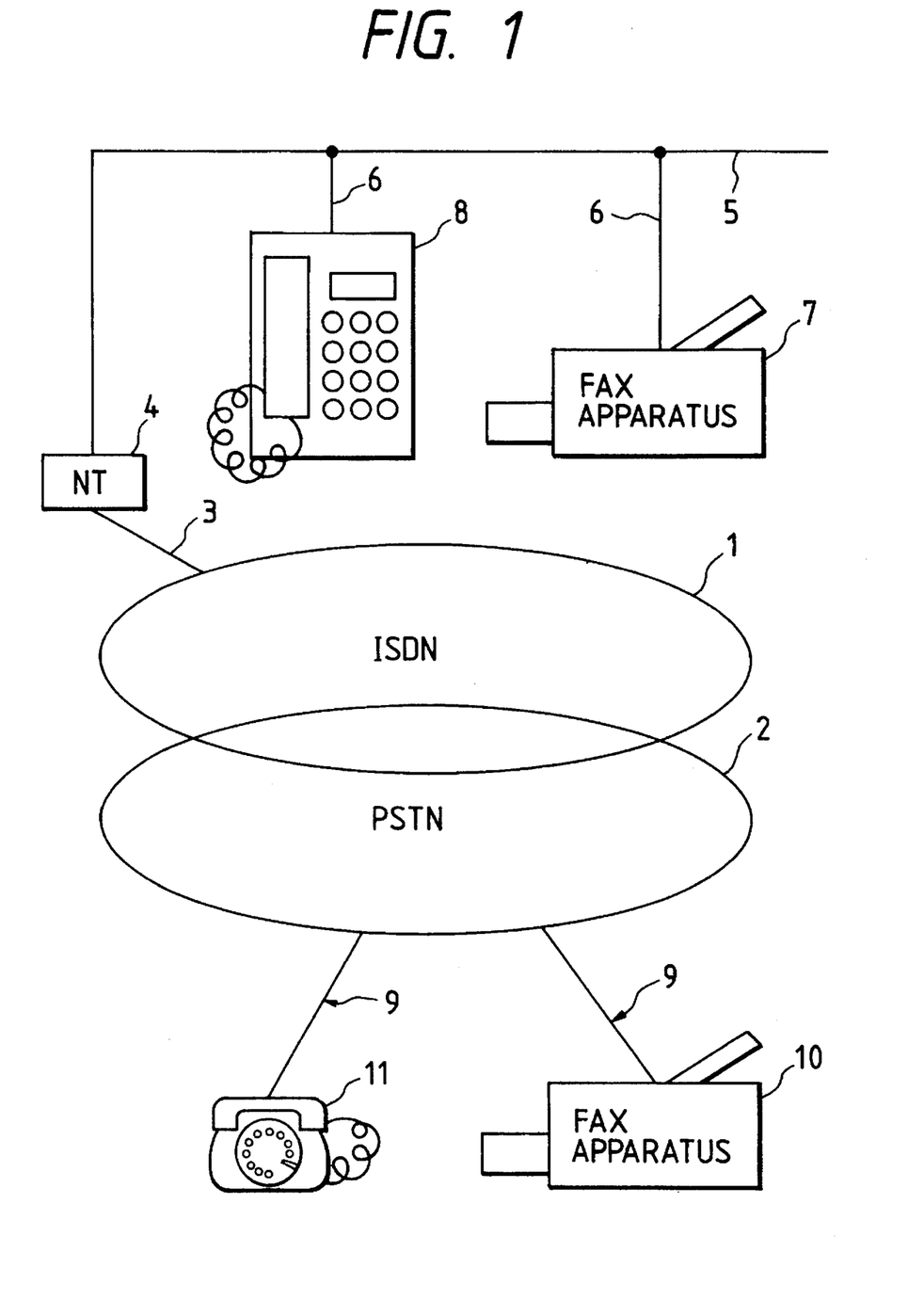
FIG. 1 is a schematic diagram showing a connection state of a communication system having facsimile apparatuses and telephones according to the first embodiment of the invention.

FIG. 1 is a schematic diagram showing a connection state of a communication system having facsimile apparatuses and telephones according to an embodiment of the invention. In the diagram, reference numeral 1 denotes an ISDN and 2 indicates a PSTN. The ISDN 1 and PSTN 2 mutually transmit and receive signals. A network terminal apparatus (NT) 4 is connected to the ISDN 1 through an ISDN subscriber's line 3. The NT 4 is connected to an edge portion of an SO bus 5. An ISDN facsimile apparatus 7 and a telephone 8 of the ISDN connection are likewise connected to the SO bus 5 through connecting lines 6, respectively. A PSTN G3 facsimile apparatus 10 and a PSTN telephone 11 are connected to the PSTN 2 through PSTN subscribers' lines 9, respectively.

Figure 2:
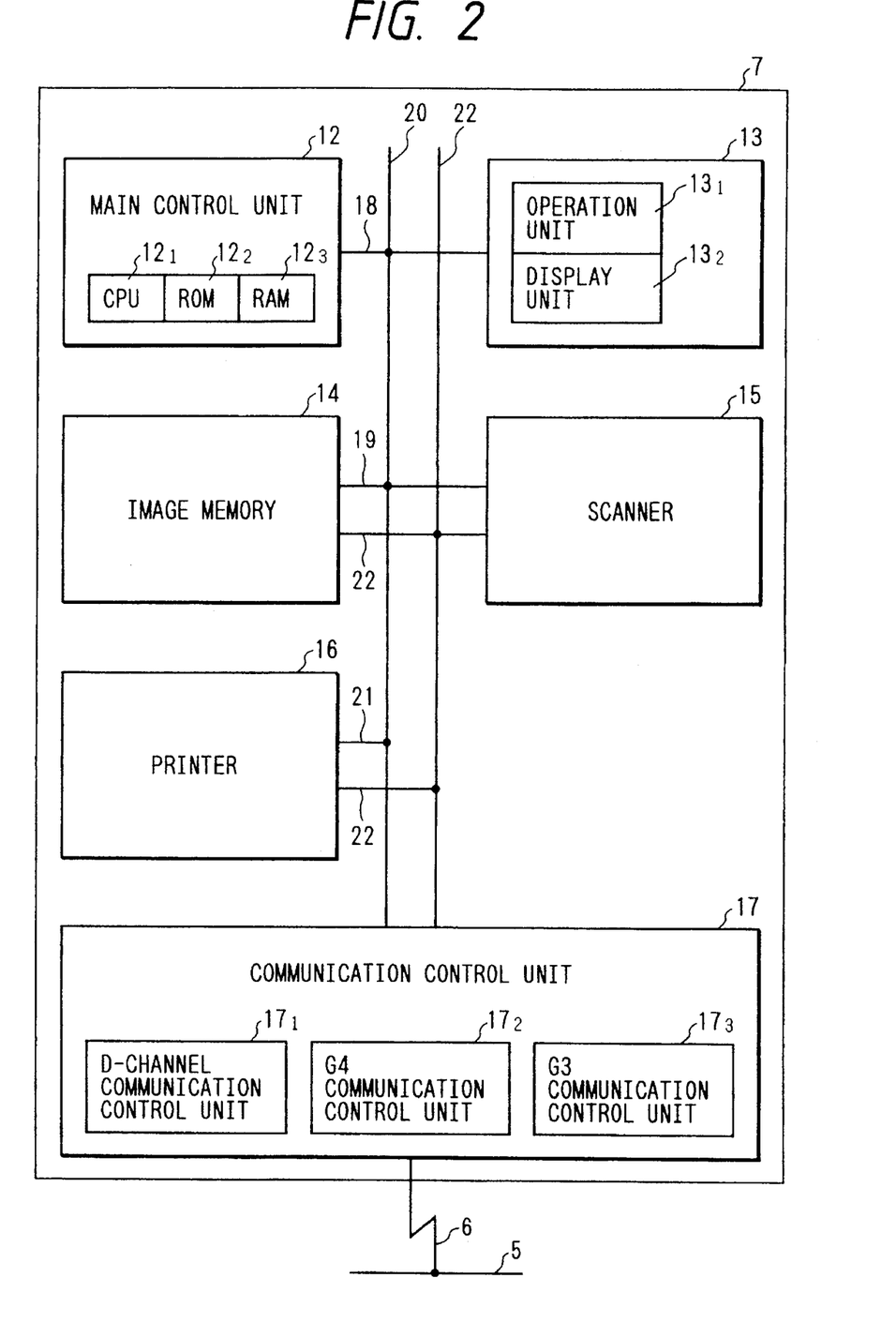
FIG. 2 is a block constructional diagram of a facsimile apparatus according to the first embodiment of the invention.

As shown in FIG. 2, the ISDN facsimile apparatus 7 has a main control unit 12, an operation/display panel 13, an image memory 14, a scanner 15, a printer 16, and a communication control unit 17. The main control unit 12 has a function to judge whether a call reception is a call reception from a telephone connected to the same bus or not. The main control unit 12 is constructed by a CPU $12_1$, a ROM $12_2$, a RAM $12_3$, and the like. The main control unit 12 is connected to a control bus 20 through a first connecting line 18. The operation/display panel 13 comprises an operation unit $13_1$ having keys to instruct a predetermined operation and a display unit $13_2$ to control a display device such as LED, LCD, or the like and to display a predetermined message. Although not shown, an interruption procedure execution instruction key, a restart procedure execution instruction key, a facsimile transfer instruction key, and the like are arranged in the operation unit $13_1$. The image memory 14 stores transmission and reception images and is connected to the control bus 20 through a second connecting line 19. The communication control unit 17 comprises a D-channel communication control unit $17_1$, a G4 communication control unit 172, and a G3 communication control unit 173. The first, second, and third connecting lines 18, 19 and 21 and the communication control unit 17 are connected to the control bus 20 for allowing the main control unit 12 to control each block. A video bus 22 to handle image data is connected to the image memory 14, scanner 15, printer 16, and communication control unit 17. The communication control unit 17 is further connected to the SO bus 5 through the connecting line 6.

Figure 3:
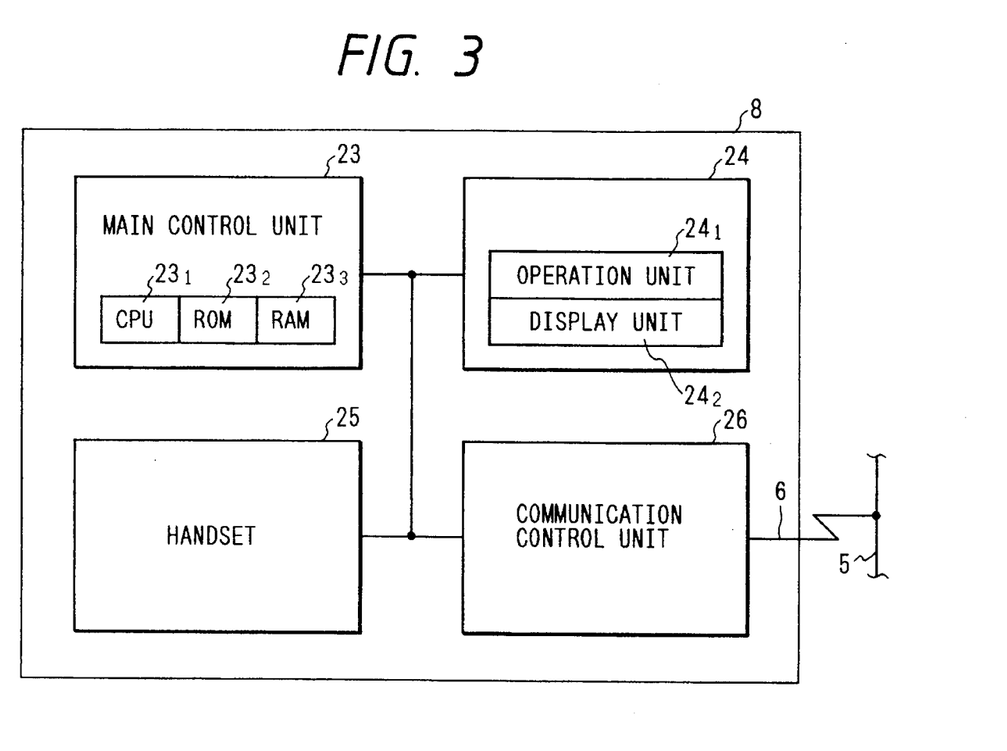
FIG. 3 is a block constructional diagram of a telephone according to the first embodiment of the invention.

As shown in FIG. 3, the ISDN connected telephone 8 comprises a main control unit 23, an operation/display panel 24, a handset 25, and a communication control unit 26. The main control unit 23 comprises a CPU $23_1$, a ROM $23_2$, a RAM $23_3$, and the like. The RAM $23_3$ stores addresses (also including subaddresses) of the facsimile apparatus 7. The operation/display panel 24 comprises an operation unit $24_1$ having keys to instruct a predetermined operation and a display unit $24_2$ to control a display device such as LED, LCD, or the like and to display a predetermined message. Although not shown, an interruption procedure execution instruction key, a restart procedure execution instruction key, a facsimile transfer instruction key, and the like are arranged in the operation unit $24_1$. The handset 25 comprises a transmission unit and a reception unit. The communication control unit 26 controls D and B channels. The SO bus 5 is connected to the communication control unit 26 through the connecting line 6.

The operation of the communication system having the facsimile apparatus 7 and telephone 8 with the above constructions, the restart operation of an interruption call in the facsimile apparatus 7, and the facsimile transferring operation in the telephone 8 will now be described with reference to a sequence diagram of FIG. 4 and flowcharts of FIGS. 5 and 6.

The first processing operation will be first described. In FIG. 1, when the PSTN G3 facsimile apparatus 10 as a call generation side generates a call to terminals (facsimile apparatus 7, telephone 8) connected to the SO bus 5 through the connecting lines 9, PSTN 2, ISDN 1, ISDN subscriber's line 3, and NT 4, a call is received on the SO bus 5 and a SETUP (request to set a call) message is sent to the ISDN telephone 8 (A in FIG. 4). The ISDN telephone 8 sends an ALERT (notification indicating that a called person is being called) message to the call generation side and the ISDN telephone 8 rings (B in FIG. 4).

Figure 4:
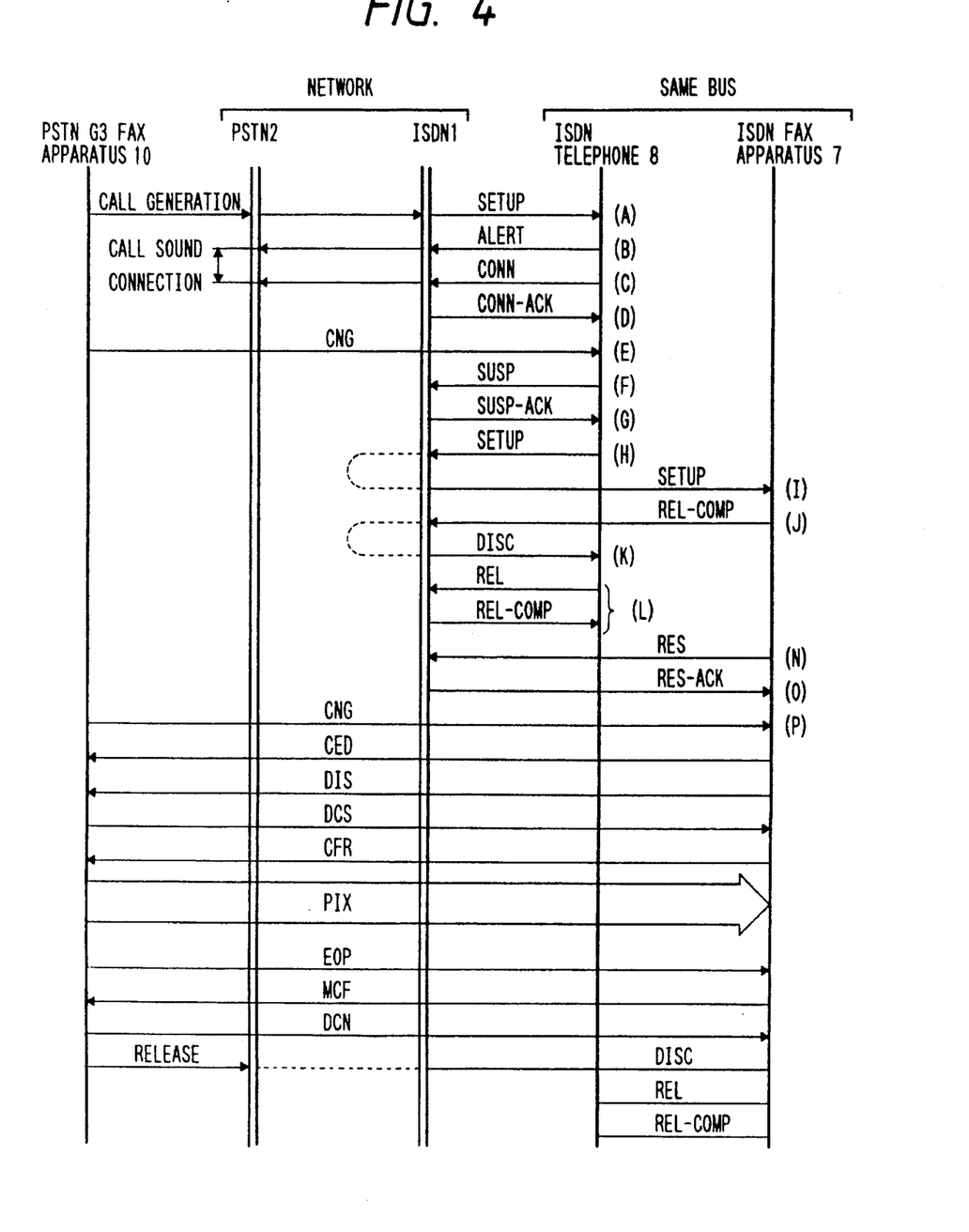
FIG. 4 is a sequence diagram showing the operation of the communication system in FIG. 1.

When the operator responds to the ISDN telephone 8, the telephone 8 sends a CONN (notification indicating that the called person has responded) message to the call generation side (C in FIG. 4). Thus, a CONN-ACK (acknowledgement of the CONN) message is sent to the ISDN telephones 8 (D in FIG. 4).

Subsequently, a CNG signal is sent to the ISDN telephone 8 from the PSTN facsimile apparatus 10 on the call generation side (E in FIG. 4). When the operator listens to the CNG signal sound and recognizes that the terminal on the call generation side is a facsimile apparatus, the operator turns on the interruption procedure execution instruction key in the operation unit 24 of the operation/display panel 24 of the ISDN telephone 8. When the above operation is detected, the ISDN telephone 8 sends an SUSP (request for temporary interruption of the call) message to the call generation side (F in FIG. 4). The ISDN 1 consequently transmits an SUSP-ACK (notification indicative of the completion of the temporary interruption) message to the ISDN telephone 8 (G in FIG. 4) and executes the interruption procedure. The call is temporarily interrupted (is set into a holding state).

Figure 5:
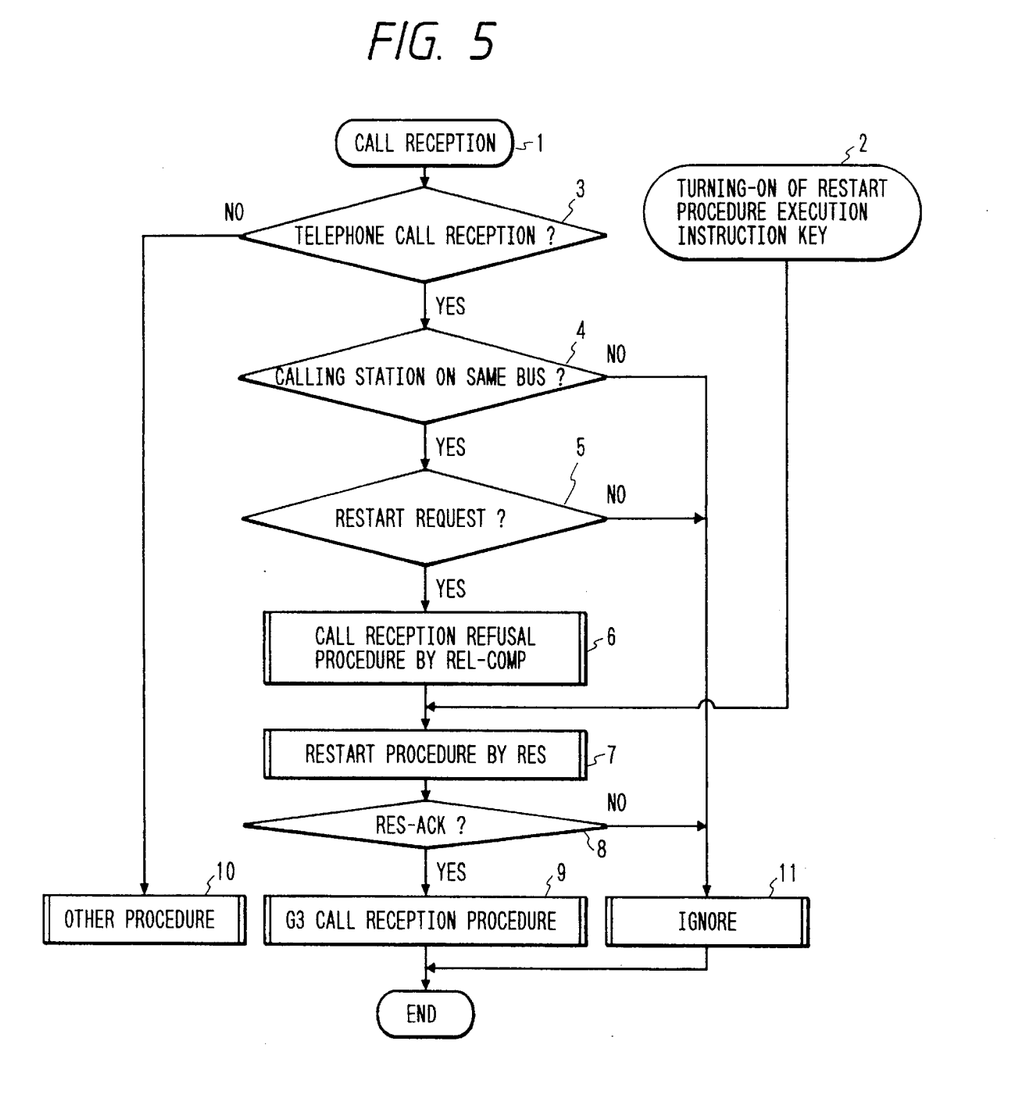
FIG. 5 is a flowchart showing a restarting operation of an interruption call in the facsimile apparatus of FIG. 2.

In the above state, when the operator turns on the restart procedure execution instruction key in the operation unit $13_1$ in the operation/display panel 13 of the ISDN facsimile apparatus 7 (step 2 in FIG. 5), the ISDN facsimile apparatus 7 sends an RES (request for the restart of the interruption call) message (N in FIG. 4) in step 7 in FIG. 5.

In step 8 in FIG. 5, the ISDN facsimile apparatus 7 checks to see if an RES-ACK (notification of the completion of the restarting process of the interruption call) message has reached or not. When the RES-ACK message has reached (O in FIG. 4), the G3 reception procedure is executed in step 9 in FIG. 5. The CNG signal is sent to the ISDN facsimile apparatus 7 from the PSTN facsimile apparatus 10 (P in FIG. 4). The above processing operations are completed.

On the other hand, when the result of the discrimination in step 8 in FIG. 5 is negative (NO), that is, when an RES-REJ (refusal of the restart of the interruption call) message reaches the ISDN facsimile apparatus 7, the call is ignored in step 11 in FIG. 5 and the above processing operation is finished.

In the above processing operation, the G3 communicating operation of the facsimile apparatus can be restarted by the key operation of the operator and the occurrence of a communication error as a facsimile apparatus on the call generation side is eliminated.

The second processing operation will now be described. First, in FIG. 1, when the PSTN G3 facsimile apparatus 10 on the call generation side generates a call to the terminals (facsimile apparatus 7, telephone 8) connected to the SO bus 5 through the connecting lines 9, PSTN 2, ISDN 1, ISDN subscriber's line 3, and NT4 a call is received on the SO bus 5 and the SETUP message reaches the ISDN telephone 8 (A in FIG. 4). The ISDN telephone 8 sends the ALERT message to the call generation side and the ISDN telephone 8 rings (B in FIG. 4).

When the operator responds to the ISDN telephone 8, the telephone 8 sends the CONN message to the call generation side (C in FIG. 4). Thus, the CONN-ACK message is sent to the ISDN telephone 8 (D in FIG. 4).

The CNG signal is subsequently sent to the ISDN telephone 8 from the PSTN facsimile apparatus 10 on the call generation side (E in FIG. 4). The above operations are similar to the first processing operation mentioned above. When the operator listens to the CNG signal sound and confirms that the terminal on the call generation side is a facsimile apparatus, the operator turns on the facsimile transfer instruction key in the operation unit $24_1$ of the operation/display panel 24 of the ISDN telephone 8. Thus, a check is made in step 61 in FIG. 6 to see if the ISDN telephone 8 is in a speech communication state or not. If NO, the above processing operation is finished. If YES, step 62 in FIG. 6 follows.

Figure 6:
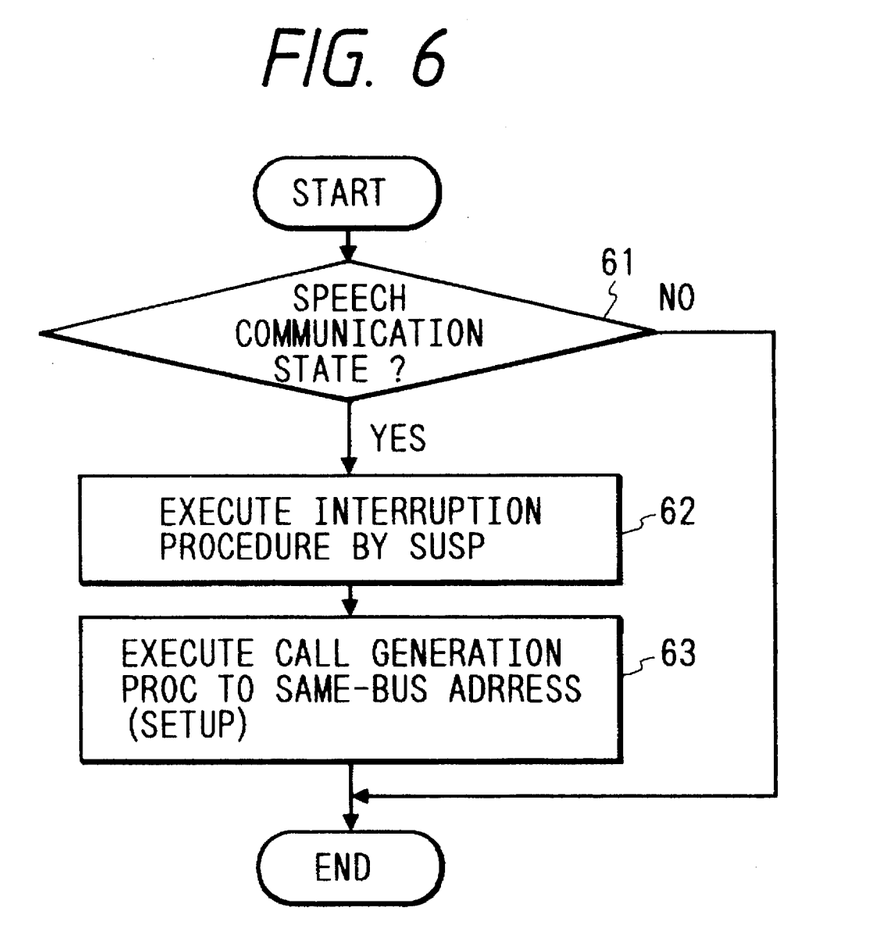
FIG. 6 is a flowchart showing a facsimile transferring operation in the telephone of FIG. 3.

In step 62 in FIG. 6, the telephone 8 sends the SUSP message to the call generation side (F in FIG. 4 ). Thus, the ISDN 1 sends the SUSP-ACK message to the ISDN telephone 8 (G in FIG. 4), the call interruption procedure is executed, and the call enters a temporary interruption state.

In step 63 in FIG. 6, a telephone call generation is executed by the SETUP message to the address (including subaddress) of the ISDN connected facsimile apparatus 7 on the same bus which has been stored in the ISDN telephone 8 (H in FIG. 4). Thus, the call is received on the ISDN facsimile apparatus 7 by the SETUP message (I in FIG. 4 and step 1 in FIG. 5).

In step 3 in FIG. 5, the facsimile apparatus 7 checks to see if the relevant call reception is a telephone call reception or not. If NO, another procedure is executed in step 10 in FIG. 5. On the other hand, when it is a telephone call reception, the facsimile apparatus 7 discriminates in step 4 in FIG. 5 to see if the relevant call reception is a call reception from the telephone 8 on the same bus or not. Such a discrimination is executed by comparing an address of a calling station which is sent by the SETUP message and the address of the telephone 8 on the bus which has previously been registered in the embodiment. In step 5 in FIG. 5, the subaddress which is indicated by the SETUP message is compared with the subaddress to request for the facsimile transfer which has previously been registered, thereby judging whether the call restart request has been performed or not. When both of the subaddresses differ, step 11 in FIG. 5 is executed and the above processing operation is finished. When they coincide, step 6 in FIG. 5 follows. In step 6, the ISDN facsimile apparatus 7 sends an REL-COMP (notification of the completion of the channel release and call number release) message (J in FIG. 4) and executes the call reception refusal procedure, thereby refusing the telephone call reception from the telephone 8 on the same bus to the facsimile apparatus 7. Subsequently, a DISC (request for the call release) message reaches the telephone 8 on the same bus (K in FIG. 4). The telephone 8 recognizes that the telephone call has been refused. The reason of the refusal is displayed on the display unit $24_2$. The telephone 8 judges that the facsimile transfer instruction has been accepted, so that the above processing operation is completed.

The facsimile apparatus 7 subsequently sends the RES message (N in FIG. 4) in step 7 in FIG. 5. After that, the facsimile apparatus 7 receives the RES-ACK message in step 8 (0 in FIG. 4). When the RES-ACK message doesn't reach in step 8, the process in step 11 in FIG. 5 is executed and the processing operation is finished. When the RES-ACK message reaches, the G3 reception procedure is executed in step 9 in FIG. 5 (P in FIG. 4).

In the above second processing operation, in place of the procedure (step 3 in FIG. 6) to generate a telephone call to indicate the transfer to the facsimile apparatus, the facsimile transfer can be also instructed by a D-channel packet communication by using a D-channel packet communication function.

It is also possible to provide a control line to execute the facsimile transfer between the telephone 8 on the same bus and the facsimile apparatus 7 and to transmit the transfer request through the control line in place of the procedure to generate the telephone call to instruct the facsimile transfer in the above second processing operation.

A second embodiment of the facsimile apparatus of the invention will now be described with reference to FIGS. 7 to 9. In the second embodiment, the same portions as those in the first embodiment shown in FIGS. 1 to 6 mentioned above are designated by the same reference numerals on the drawings.

The facsimile apparatus 7 in the second embodiment differs from the facsimile apparatus 7 in the above first embodiment with respect to a point that a voice synthesis output unit 30 to generate an alarm sound, a voice message, or the like is provided. The voice synthesis output unit 30 is connected to the control bus 20 through the third connecting line 21.

Figure 7:
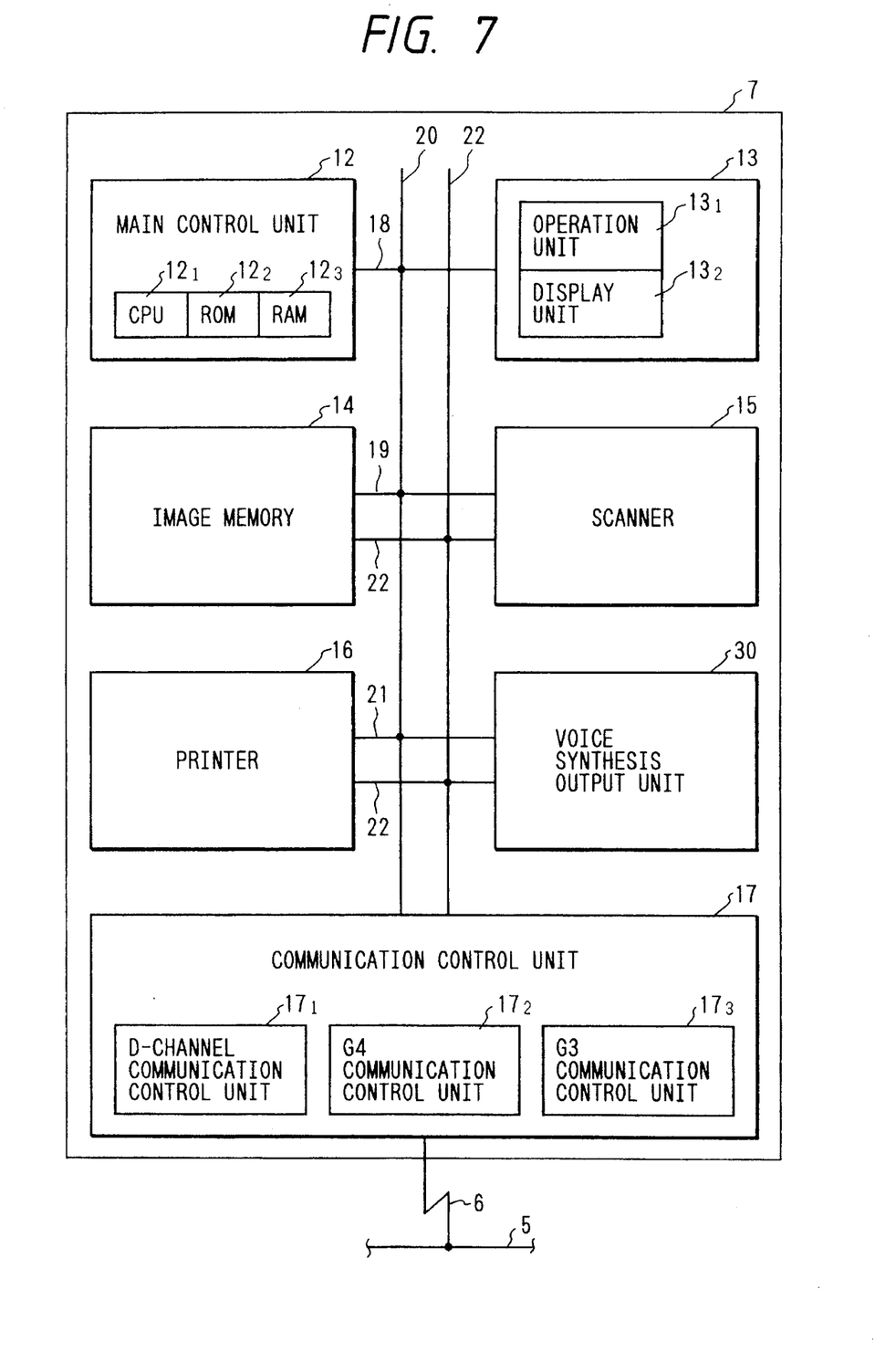
FIG. 7 is a block constructional diagram of a facsimile apparatus according to the second embodiment of the invention.
Figure 8:
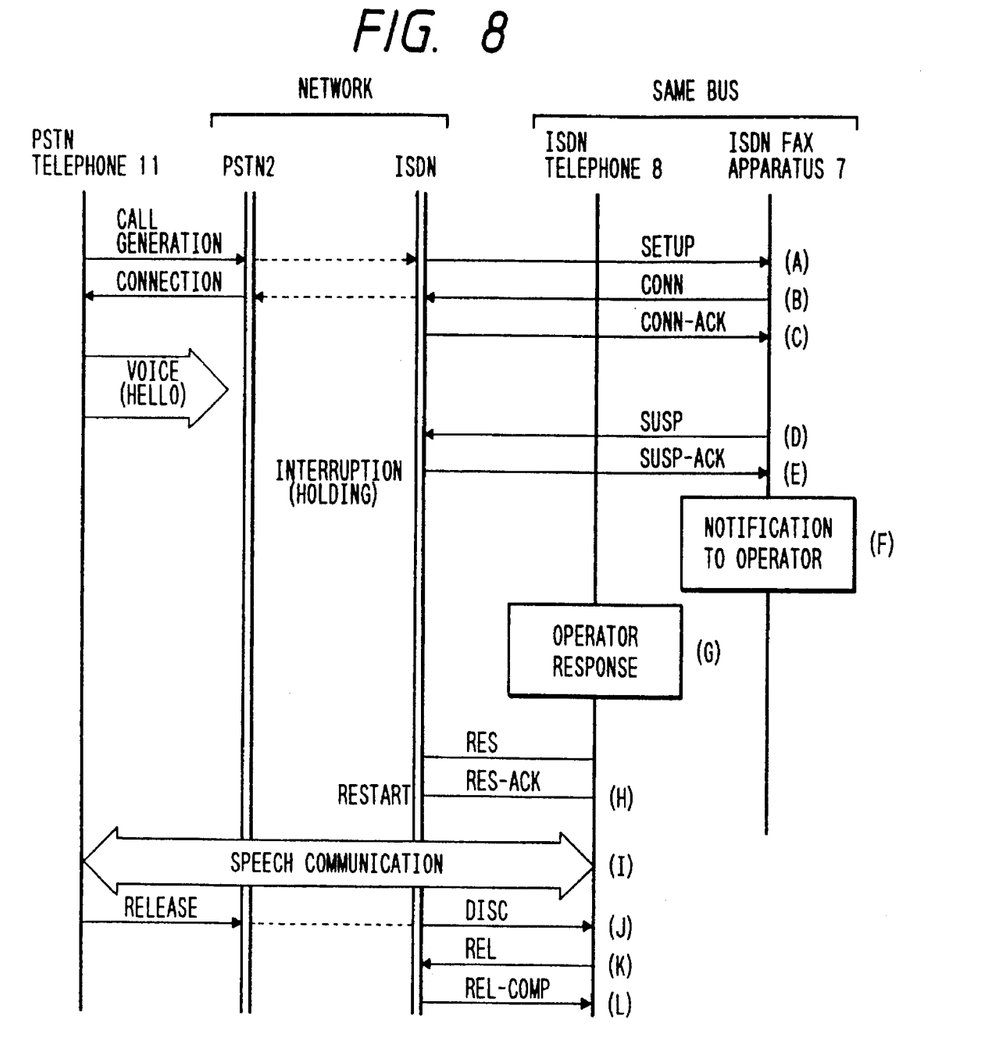
FIG. 8 is a sequence diagram showing the operation of a communication system having the facsimile apparatus of FIG. 7.

When the PSTN telephone 10 on the call generation side in FIG. 1 generates a call to the terminals (facsimile apparatus 7, telephone 8) connected to the SO bus 5 through the connecting lines 9, PSTN 2, ISDN 1, ISDN subscriber's line 3, and NT 4, the call is received on the SO bus 5 and the SETUP message reaches the ISDN facsimile apparatus 7 (A in FIG. 8). In response to the SETUP message, the facsimile apparatus 7 responds as a G3 reception call (reception call response via the PSTN 2) and sends the CONN message (B in FIG. 8). Thus, the CONN-ACK message is sent to the ISDN facsimile apparatus 7 (C in FIG. 8). When the ISDN facsimile apparatus 7 responds as a reception call via the PSTN 2, a check is made in step 91 in FIG. 9 to see if the terminal on the call generation side is the G3 facsimile apparatus 10 or not. In the embodiment, such a discrimination is performed by checking whether the CNG signal has been received by the G3 communication control unit $17_3$ of the communication control unit 10 shown in FIG. 7 within a predetermined time or not.

Figure 9:
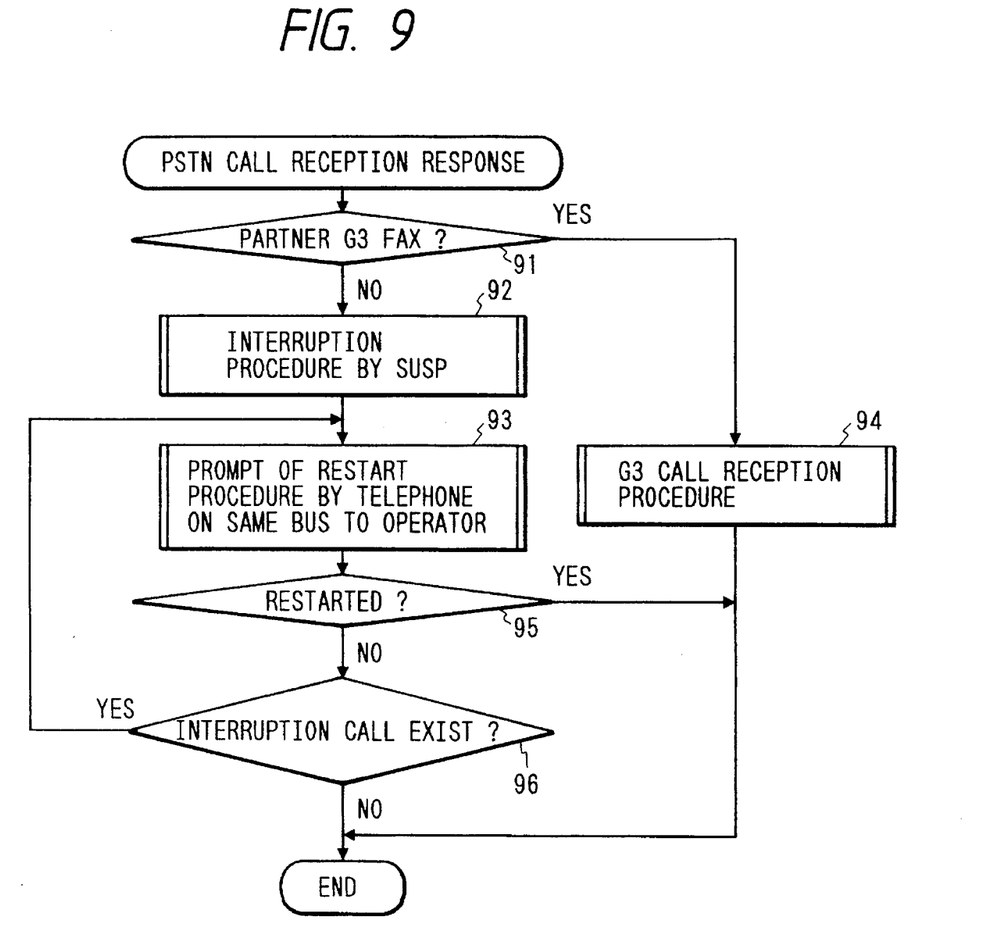
FIG. 9 is a flowchart showing the operation when the facsimile apparatus of FIG. 7 has automatically received a call reception via the PSTN.

That is, when it is determined that the terminal on the call generation side is the G3 facsimile apparatus 10 by the reception of the CNG signal, the G3 reception procedure is executed in step 94 in FIG. 9 and the protocol is progressed. After that, the processing operation is finished. When the predetermined time has elapsed without receiving the CNG signal, the facsimile apparatus 7 decides that the terminal on the call generation side is not the G3 facsimile apparatus 10 and the processing routine advances to step 92 in FIG. 9. In step 92, the ISDN facsimile apparatus 7 sends the SUSP message of the D-channel protocol (D in FIG. 8). The ISDN 1 transmits the SUSP-ACK message to the facsimile apparatus 7 and executes the call interruption procedure, thereby setting the reception call which the ISDN facsimile apparatus 7 has responded into the temporary interruption (holding) state (E in FIG. 8).

The processing routine advances to step 93 in FIG. 9 and the facsimile apparatus 7 shown in FIG. 7 controls the voice synthesis output unit 30 in order to instruct the operator to restart the reception call in the temporary interruption state by the telephone 8 on the same bus. For instance, a voice message indicating that "Please pick up the telephone near you." or the like or a pseudo calling sound or the like is generated, thereby alarming to the operator (F in FIG. 8).

When the operator responds to the above notification and the ISDN telephone 8 on the same bus sends the RES message to the ISDN 1 by using the restarting function which the telephone 8 has (G in FIG. 8). Consequently, the RES-ACK message reaches the telephone 8 (H in FIG. 8) and the restart procedure of the D-channel protocol is executed. Thus, a speech communication can be executed between the telephone 10 of the PSTN connection on the call generation side and the telephone 8 of the ISDN connection on the call reception side (I in FIG. 8).

In step 95 in FIG. 9, the ISDN facsimile apparatus 7 checks the D-channel message of the SO bus 5 by the D-channel communication control unit $17_1$ of the communication control unit 17, thereby discriminating whether the restart procedure has been executed or not. When the restart procedure is restarted, the processing operation is finished. When the restart procedure is not executed, step 96 in FIG. 9 follows and a check is made to see if the call of the temporary interruption state (interruption call) still exists or not. When it is determined that the interruption call exists, the processing routine is returned to step 93 in FIG. 9 and the above processes are repeated.

When the speech communication in (I) in FIG. 8 is finished, the PSTN telephone 10 on the call generation side sends the DISC message to the ISDN telephone 8 on the call reception side (J in FIG. 8). In response to the DISC message, the REL message is sent from the telephone 8 (K in FIG. 8). The REL-COMP message reaches the telephone 8 (L in FIG. 8) and the call is released.

Before the interruption procedure is executed in (D) and (E) in FIG. 8, by sending a voice message such as "Please wait for a little while." or the like from the voice synthesis output unit 30 of the facsimile apparatus 7 to the line, a confusion in association with a sense of unease of the operator on the call generation side can be prevented.

Although the preferred embodiment of the invention has been described above, the invention is not limited to the foregoing embodiment but many modifications and variations are possible within the spirit and scope of the appended claims of the invention.

What is claimed is:

1. A control method of a terminal for an integrated services digital network, comprising the steps of:

generating an instruction to restart a call which has been interrupted by another terminal having a voice attribution by a manual operation;

transmitting to the digital network a first message to request a restart of the interrupted call in response to the instruction;

receiving a second message indicating the restart of the interrupted call from the digital network; and perfoming a G3 image communication in the form of digital voice data through the digital network in response to the second message.

2. A method according to claim 1, wherein the instruction is generated in response to an operation of a restart key.

3. A terminal for an integrated services digital network comprising:

manual instruction means for instructing a restart of a call which has been interrupted by another terminal having a voice attribution;

transmitting means for transmitting to the digital network a first message to request a restart of the interrupted call in response to an instruction by said manual instruction means;

receiving means for receiving a second message indicating the restart of the interrupted call from the digital network; and image communication means for performing a G3 image communication in the form of digital voice data through the digital network in response to the second message.

4. A terminal according to claim 3, wherein said manual instruction means includes a restart key to instruct the restart of the interrupted call.

5. A communication system for an integrated services digital network comprising:

a digital telephone, including means for performing a voice communication through the digital network, and means for requesting an interruption of a call to the digital network; and manual instruction means for instructing a restart of the call interrupted by said digital telephone, transmitting means for transmitting to the digital network a first message to request a restart of the interrupted call in response to an instruction by said manual instruction means, receiving means for receiving a second message indicating the restart of the interrupted call from the digital network, and image communication means for performing a G3 image communication in the form of digital voice data through the digital network in response to the second message.

6. A system according to claim 5, wherein said digital telephone includes an interruption key to request the interruption of the call.

7. A system according to claim 5, wherein said manual instruction means includes a restart key to instruct the restart of the interrupted call.

8. A communication terminal for communicating via a digital network which has an interruption function for interrupting a call, said terminal comprising:

manual instruction means for instructing a restart of a call which has been interrupted by another terminal having a voice attribution;

transmitting means for transmitting to the digital network a first message to request a restart of the interrupted call in response to an instruction by said manual instruction means;

receiving means for receiving a second message indicating the restart of the interrupt call from the digital network; and image communication means for performing a G3 image communication in the form of digital voice data through the digital network in response to the second message.

9. A terminal according to claim 8, wherein said manual instruction means includes a restart key to instruct the restart of the interrupted call.

10. A terminal according to claim 8, wherein the network includes an integrated services digital network (ISDN).

11. A control method for a terminal communicating via a digital network which has an interruption function for interrupting a call, said method comprising the steps of:

generating an instruction to restart a call which has been interrupted by another terminal having a voice attribution by a manual operation;

transmitting to the digital network a first message to request a restart of the interrupted call in response to the instruction;

receiving a second message indicating the restart of the interrupted call from the digital network; and performing a G3 image communication in the form of digital voice data through the digital network in response to the second message.

12. A method according to claim 11, wherein the instruction is generated in response to an operation of a restart key.

13. A method according to claim 11, wherein the network includes an integrated services digital network (ISDN).

14. A communication system for communicating via a digital network which has an interruption function for interrupting a call, said system comprise:

a digital telephone, including means for perfoming a voice communication through the digital network, and means for requesting an interruption of a call to the digital network; and a data terminal, including manual instruction means for instructing a restart of the call interrupted by said digital telephone, transmitting means for transmitting to the digital network a first message to request a restart of the interrupted call in response to an instruction by said manual instruction means, receiving means for receiving a second message indicating the restart of the interrupted call from the digital network, and image communication means for performing a G3 image communication in the form of digital voice data through the digital network in response to the second message.

15. A system according to claim 14, wherein said digital telephone includes an interruption key to request the interruption of the call.

16. A system according to claim 15, wherein said manual instruction means includes a restart key to instruct the restart of the interrupted call.

17. A system according to claim 14, wherein the network includes an integrated services digital network (ISDN).

18. A digital telephone for communicating via a digital network which has an interruption function for interrupting a call, the telephone comprising:

manual instruction means for transferring a received call to a facsimile terminal which performs a G3 image communication in the form of digital voice data;

transmitting means for transmitting to the digital network a first message to interrupt the received call in response to an instruction by said manual instruction means;

receiving means for receiving a second message indicating the interruption of the received call from the digital network; and transferring means for performing a transfer procedure between the facsimile terminal and the digital telephone in response to the second message.

19. A telephone according to claim 18, wherein said manual instruction means includes a facsimile transfer key.

20. A telephone according to claim 18, wherein said transferring means performs an extension call to the facsimile terminal and informs the facsimile terminal of a transfer of the interrupted call by the extension call.

21. A communication system for communicating through a digital network which is an interruption function for interrupting a call, said system comprising:

a digital telephone, including manual instruction means for transferring a received call to a facsimile terminal which performs a G3 image communication in the form of digital voice data, transmitting means for transmitting to the digital network a first message to interrupt the received call in response to an instruction by said manual instruction means receiving means for receiving a second message indicating the interruption of the received call from the digital network, and transferring means for performing a transfer procedure between the facsimile terminal and the digital telephone in response to the second message; and the facsimile terminal, including transmitting means for transmitting to the digital network a third message to request a restart of the interrupt call after performing the transfer procedure, receiving means for receiving a fourth message indicating the restart of the interrupted call from the digital network, and image communication means for performing the G3 image communication in the form of digital voice data through the digital network in response to the fourth message.

22. A system according to claim 21, wherein said manual instruction means includes a facsimile transfer key.

23. A system according to claim 21, wherein said transferring means performs an extension call to the facsimile terminal and informs the facsimile terminal of a transfer of the interrupted call by the extension call.

24. A system according to claim 23, wherein the facsimile terminal receives the extension call from the digital telephone, discriminates whether or not the extension call indicates transferring the interrupted call to the digital telephone, and transmits the third message to the digital network in accordance with the discrimination.

25. A system according to claim 21, wherein the digital network includes an integrated services digital network.

* * * * *